US012580778B2

(12) United States Patent
Obstfeld et al.

(10) Patent No.: US 12,580,778 B2
(45) Date of Patent: Mar. 17, 2026

(54) TRACEABILITY AND OBSERVABILITY FOR DISTRIBUTED APPLICATIONS

(71) Applicant: Cisco Technology, Inc., San Jose, CA (US)

(72) Inventors: Joel A. Obstfeld, Hertfordshire (GB); Oliver James Bull, Bristol (GB); Andrew Pletcher, Scotts Valley, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 215 days.

(21) Appl. No.: 18/360,321

(22) Filed: Jul. 27, 2023

(65) Prior Publication Data

US 2025/0039000 A1 Jan. 30, 2025

(51) Int. Cl.
*H04L 9/32* (2006.01)
*H04N 21/4788* (2011.01)
*H04N 21/63* (2011.01)

(52) U.S. Cl.
CPC ....... *H04L 9/3297* (2013.01); *H04N 21/4788* (2013.01); *H04N 21/63* (2013.01); *H04N 21/632* (2013.01)

(58) Field of Classification Search
CPC .... H04L 9/3297; H04N 21/63; H04N 21/632; H04N 21/4788
See application file for complete search history.

(56) References Cited

U.S. PATENT DOCUMENTS

| | | | | |
|---|---|---|---|---|
| 6,230,312 | B1 * | 5/2001 | Hunt | G06F 9/465 |
| | | | | 719/331 |
| 7,673,053 | B1 * | 3/2010 | Foster | H04L 67/562 |
| | | | | 709/227 |
| 11,611,615 | B1 * | 3/2023 | Long | H04L 67/108 |

(Continued)

OTHER PUBLICATIONS

Kasireddy, P., "The Architecture of a Web 3.0 application," Blockchain, https://www.preethikasireddy.com/post/the-architecture-of-a-web-3-0-application, Sep. 22, 2021, 31 pages.

(Continued)

*Primary Examiner* — Azizul Choudhury
(74) *Attorney, Agent, or Firm* — Edell, Shapiro & Finnan, LLC

(57) ABSTRACT

A method, computer system, and computer program product are provided for providing traceability and observability for decentralized applications. A plurality of transaction metadata records are obtained corresponding to a plurality of transactions related to execution of a computing task by a decentralized application, wherein each transaction metadata record includes a same operation record that identifies the computing task, and an actor identifier that indicates an identity of an entity involved in a particular transaction of the plurality of transactions. A longitudinal history of the execution of the computing task is generated that identifies the entity involved in each transaction based on the plurality of transaction metadata records. An operational state of one or more entities is determined based on comparing the longitudinal history of the execution of the computing task to data relating to a different computing task.

20 Claims, 7 Drawing Sheets

(56)            References Cited

U.S. PATENT DOCUMENTS

2011/0296241  A1*  12/2011  Elnozahy ............ G06F 11/1482
                                                  714/19
2013/0332926  A1*  12/2013  Jakoljevic ........... G06F 9/45533
                                                  718/1
2016/0149769  A1     5/2016  Joshi et al.
2018/0075098  A1*   3/2018  Yin .................... G06F 16/24561
2018/0130050  A1     5/2018  Taylor et al.
2019/0342084  A1    11/2019  Mehedy et al.
2020/0042958  A1     2/2020  Soundararajan et al.
2020/0074117  A1     3/2020  Camenisch et al.
2020/0184470  A1     6/2020  Singh et al.
2020/0310884  A1*  10/2020  Villalobos ............. G06F 16/909
2020/0388359  A1*  12/2020  Bhandari .............. H04L 67/306
2021/0194700  A1     6/2021  Moy et al.
2021/0312088  A1    10/2021  Choi
2021/0365930  A1    11/2021  Fay et al.
2022/0217113  A1     7/2022  Khan et al.
2023/0206364  A1*   6/2023  Davis ................... G06V 30/413
                                                  705/311
2023/0252405  A1*   8/2023  Bales ................. G06Q 10/0833
                                                  705/28
2024/0242545  A1*   7/2024  Salako ................. G07C 5/0825

OTHER PUBLICATIONS

MW Team, "Web3 observability: How to monitor Web3 applications," Middleware, https://middleware.io/blog/web3-observability, Dec. 6, 2022, 22 pages.

Cisco, "Cisco AppDynamics," Data Centers, https://www.cisco.com/c/en/us/solutions/data-center/appdynamics-application-performance-monitoring.html, retrieved from the Internet on Jul. 26, 2023, 8 pages.

Kasprzok, A., "Observability Pipelines," Datadog, https://www.datadoghq.com/product/observability-pipelines/, retrieved from the Internet on Jul. 26, 2023, 8 pages.

Metamask, "The crypto wallet for Defi, Web3 Dapps and NFTs," https://metamask.io/, retrieved from the Internet on Jul. 26, 2023, 10 pages.

Trossen, et al., "Impact of Distributed Ledgers on Provider Networks," Industry IoT Consortium, Whitepaper, Jan. 10, 2022, 20 pages.

"Seamlessly Connected Blockchains," Layer Zero, https://layerzero.network, retrieved from the Internet on May 5, 2023, 4 pages.

Connext Labs, "Welcome to the Connext Docs," https://docs.connext.network/, May 5, 2023, 3 pages.

Mcbride, M., et al., "BGP Blockchain," Workgroup: Network Working Group, Internet-Draft: draft-mcbride-rtgwg-bgp-blockchain-02, https://datatracker.ietf.org/doc/draft-mcbride-rtgwg-bgp-blockchain/, Published: Mar. 6, 2023, 13 pages.

Wang, Q., et al., "Exploring Web3 From the View of Blockchain," (Tech Report), https://www.researchgate.net/publication/361416088_Exploring_Web3_From_the_View_of_Blockchain, Jun. 17, 2022, 38 pages.

Kaleido, "Your Web3 Platform for Blockchain & Digital Assets," Enterprise-Grade Blockchain & Digital Asset Platform, retrieved from https://www.kaleido.io/, on Jul. 26, 2023, 9 pages.

Tenderly, "Enabling Web3 developers to build, test, monitor, and operate smart contracts from their inception to mass adoption.," Ethereum Development Platform, retrieved from https://tenderly.co/, Jul. 26, 2023, 11 pages.

Settlemint, "Blockchain Made Easy.," Blockchain Application Development Platform, retrieved from https://www.settlemint.com/, on Jul. 26, 2023, 26 pages.

Cloudflare, "Your Gateway To Web3," Easy access to IPFS and Ethereum networks, retrieved from https://www.cloudflare.com/application-services/products/web3/ on Jul. 26, 2023, 9 pages.

* cited by examiner

300

NETWORK I/F — 314

PROCESSOR — 316

API(s) — 318

COLLECTION MODULE — 320

RECORD PROCESSING MODULE — 322

317

MEMORY

DATABASE — 324

TRACING SERVER

312

NETWORK I/F — 304

PROCESSOR — 306

CLIENT MODULE — 310

MEMORY — 308

CLIENT DEVICE

302

328

NETWORK

COMPUTING SERVICE — 326A

COMPUTING SERVICE — 326B

COMPUTING SERVICE — 326N

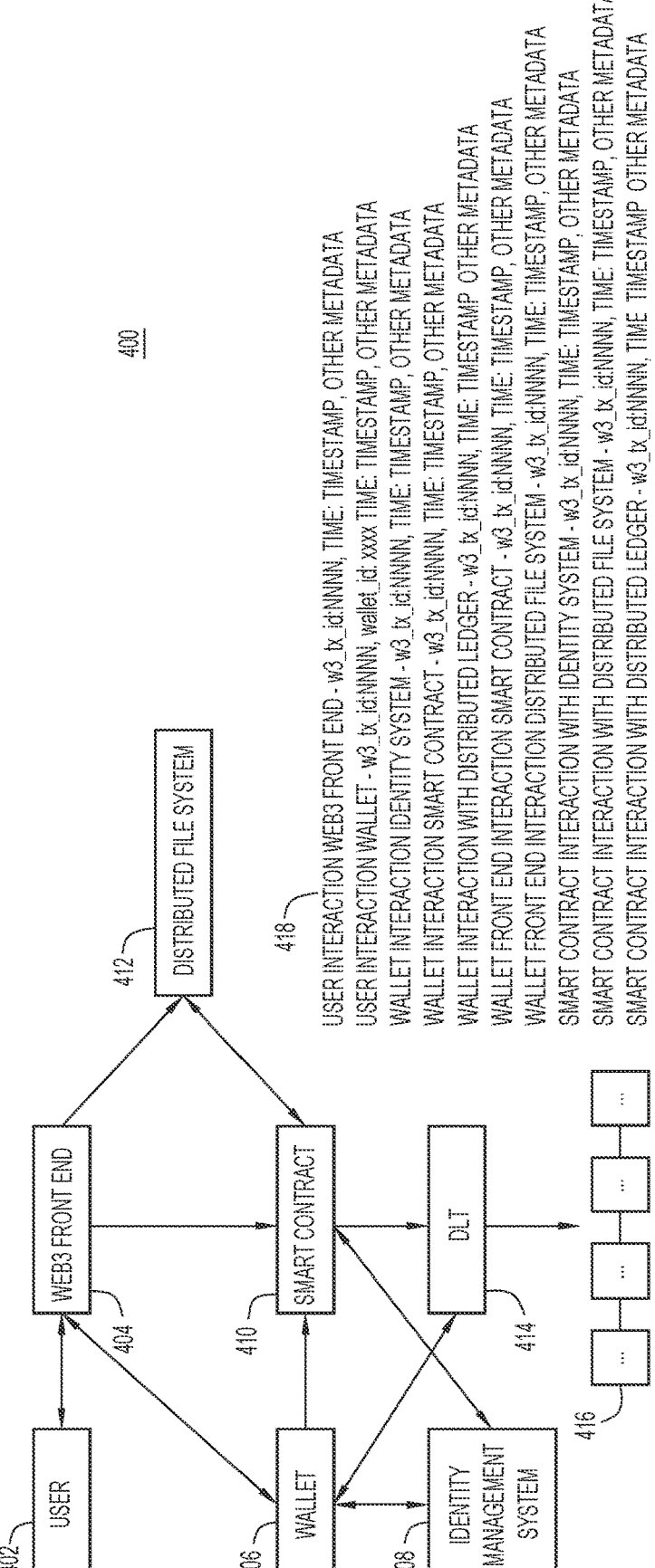

400

USER INTERACTION WEB3 FRONT END - w3_tx_id:NNNN, TIME: TIMESTAMP, OTHER METADATA
USER INTERACTION WALLET - w3_tx_id:NNNN, wallet_id: xxxx TIME: TIMESTAMP, OTHER METADATA
WALLET INTERACTION IDENTITY SYSTEM - w3_tx_id:NNNN, TIME: TIMESTAMP, OTHER METADATA
WALLET INTERACTION SMART CONTRACT - w3_tx_id:NNNN, TIME: TIMESTAMP, OTHER METADATA
WALLET INTERACTION WITH DISTRIBUTED LEDGER - w3_tx_id:NNNN, TIME: TIMESTAMP OTHER METADATA
WALLET FRONT END INTERACTION SMART CONTRACT - w3_tx_id:NNNN, TIME: TIMESTAMP, OTHER METADATA
WALLET FRONT END INTERACTION DISTRIBUTED FILE SYSTEM - w3_tx_id:NNNN, TIME: TIMESTAMP, OTHER METADATA
SMART CONTRACT INTERACTION WITH IDENTITY SYSTEM - w3_tx_id:NNNN, TIME: TIMESTAMP, OTHER METADATA
SMART CONTRACT INTERACTION WITH DISTRIBUTED FILE SYSTEM - w3_tx_id:NNNN, TIME: TIMESTAMP, OTHER METADATA
SMART CONTRACT INTERACTION WITH DISTRIBUTED LEDGER - w3_tx_id:NNNN, TIME: TIMESTAMP, OTHER METADATA

418

412 DISTRIBUTED FILE SYSTEM

WEB3 FRONT END
404

SMART CONTRACT
410

DLT
414

USER
402

WALLET
406

IDENTITY MANAGEMENT SYSTEM
408

START

OBTAIN TRANSACTION METADATA
RECORDS

610

ANALYZE TRANSACTION METADATA
RECORDS TO GENERATE
LONGITUDINAL HISTORY

620

COMPARE LONGITUDINAL HISTORY
TO OTHER DATA TO IDENTIFY
COMMON ENTITIES

630

END

TRACEABILITY AND OBSERVABILITY FOR DISTRIBUTED APPLICATIONS

TECHNICAL FIELD

The present disclosure relates generally to Web3 applications, and more specifically, to providing traceability and observability for distributed/decentralized applications.

BACKGROUND

Web3 is an idea for a new iteration of the World Wide Web which incorporates concepts such as decentralization, blockchain technologies, and token-based economics. In contrast to previous paradigms (e.g., Web 2.0), data and content are decentralized rather than stored in centralized databases or provided by centralized servers. Web3 technologies may include decentralized ledgers, smart contracts, decentralized storage solutions, and distributed/decentralized applications ("dApps") that can execute code. In the case of distributed applications, it can be difficult to track execution (e.g., for debugging purposes) as there is no central server that performs the processing.

BRIEF DESCRIPTION OF THE DRAWINGS

FIG. 4 is a flow diagram of the collection of data in a distributed application environment, according to an example embodiment.

DETAILED DESCRIPTION

Overview

Figure 1:
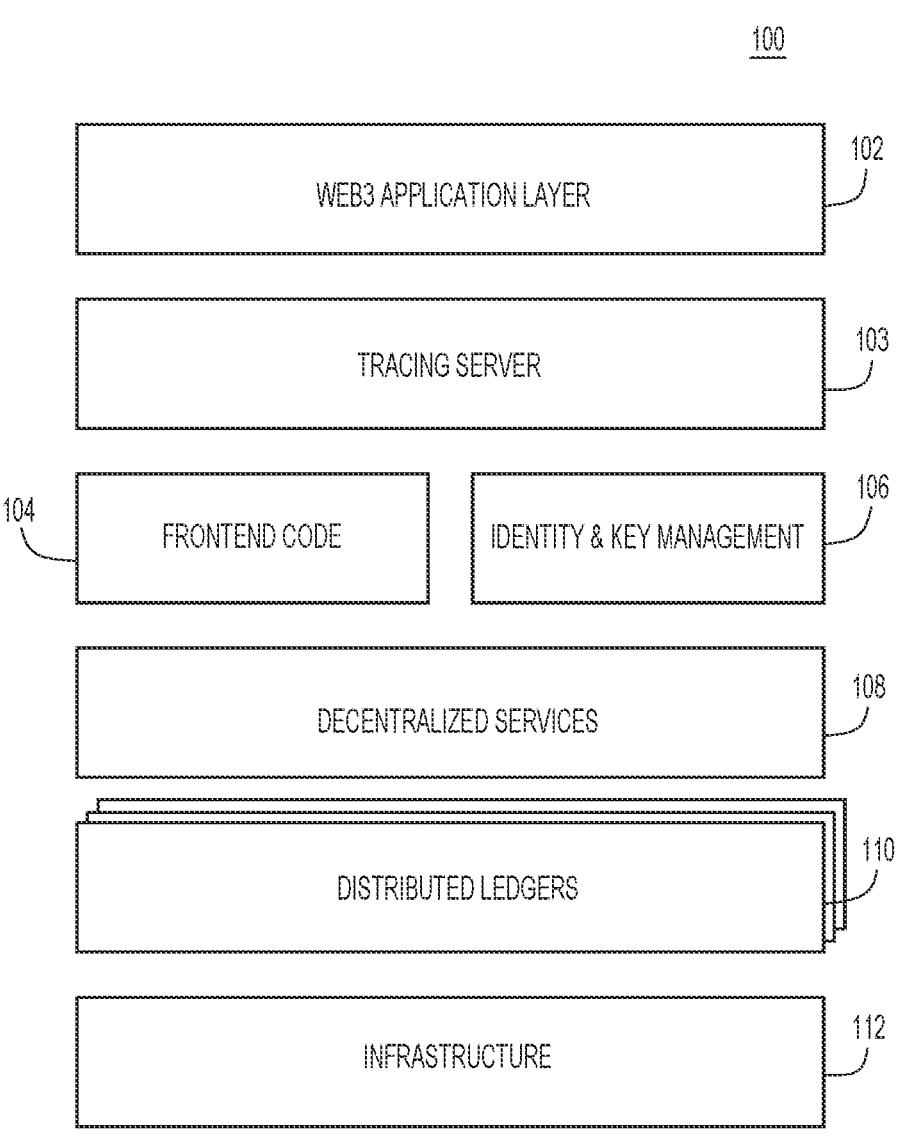
FIG. 1 is a block diagram of a Web3 environment for utilizing, supporting, and/or providing Web3 services, according to an example embodiment.

According to one embodiment, techniques are provided for providing traceability and observability for distributed/decentralized applications. A plurality of transaction metadata records are obtained corresponding to a plurality of transactions related to execution of a computing task by a decentralized application, wherein each transaction metadata record includes a same operation record that identifies the computing task, and an actor identifier that indicates an identity of an entity involved in a particular transaction of the plurality of transactions. A longitudinal history of the execution of the computing task is generated that identifies the entity involved in each transaction based on the plurality of transaction metadata records. An operational state of one or more entities is determined based on comparing the longitudinal history of the execution of the computing task to data relating to a different computing task.

Example Embodiments

Present embodiments relate to Web3 applications, and more specifically, to providing traceability and observability for distributed/decentralized applications. Decentralized applications may typically have a distributed front-end, decentralized back-end infrastructure (including, e.g., access nodes, contribution nodes, smart-contract execution environments, etc.). Thus, decentralized applications occupy a topology in which there is no single point of administrative control. While this is the intent and design principle of such applications, the nature of decentralized infrastructure creates challenges with respect to operational behavior monitoring, performance monitoring and system troubleshooting. These issues are compounded in situations where multiple distributed infrastructures are in use, such as in cross-chain applications.

To address this problem, the embodiments presented herein provide an improved approach to tracking the execution of distributed applications, which may involve multiple individual transactions across various computing entities. In particular, for a given execution task of a distributed application, an "operation record" is created and inserted in the execution request; this operation record is included in each individual transaction involved in the execution task, and can be associated with timestamps and identities of particular nodes involved in each transaction. This metadata can be collected and processed to provide a longitudinal history of a given execution task that indicates the time of transaction events and nodes involved in each step, as well as which distributed ledgers or other networks are involved. The longitudinal history can then be analyzed to identify issues with a distributed application, such as nodes with latency or throughput issues.

Thus, present embodiments improve the technical field of distributed ledger technology by improving traceability and observability of Web3 distributed applications. Due to the volume of individual transactions, conventional approaches cannot construct longitudinal histories of complex execution tasks, especially when these tasks span multiple different distributed ledgers. Thus, present embodiments provide the practical application of enabling any relevant data for a computing task of distributed applications to be collected and analyzed in order to perform troubleshooting tasks, testing, and other operations. Present embodiments can improve the functioning of computing devices by providing for the automatic identification of issues or errors with distributed applications, which can also be automatically remedied to prevent, e.g., wasted processing, memory, and/or network resources, to improve the speed of distributed computing tasks, to mitigate or eliminate errors in distributed computing tasks, and the like.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

The term "Web3" denotes a collection of technologies and network models that collectively provide a decentralized approach in contrast to the prevailing centralized model of systems and solutions. In a centralized model, services are provided at the discretion of a single administrative entity. Conversely, in a decentralized model, services are delivered through the collaborative efforts of various administrative entities without a singular point of ownership or control. The primary objective of Web3 is to facilitate the creation of services composed of logical infrastructure offered by diverse administrative entities.

In such an environment, a set of technologies is used to establish trust and assurance concerning the operation and execution of services. This entails fostering trust and assurance among administrative entities offering logical infrastructure, as well as ensuring trust and assurance for the users of the resulting services. This set of technologies may encompass distributed ledgers, consensus mechanisms, payment methods for service exchanges, decentralized protocols, and smart contracts. These technologies work in tandem to enable the development of applications and services.

In a Web3 paradigm, distributed ledger technology (DLT) may be employed to provide various services. DLT may be an append-only distributed data structure that includes authenticity and integrity features in which updates (inserts) are accepted via a consensus mechanism among validators. Validators may refer to blockchain contribution operators that run a block consensus protocol. Blockchains refer to a type of DLT wherein the underlying data structure includes a hash chain of blocks of data. Contribution nodes are a component of a distributed ledger that provide compute, storage, and/or bandwidth services for running a DLT, blockchain, or other decentralized service. In DLT, contribution tokens may be a unit of value bound to the action of contributing to a peer-to-peer network running the DLT or blockchain; value tokens may store value and can be traded as assets. In the context of Web3, a smart contract may include a computer program that is configured to automatically execute, control, or document relevant events and actions according to the terms of a contract or agreement. A DLT may implement smart contracts by including a state machine that can be updated via DLT updates. A DLT may interface with one or more oracles, which are independent entities that provide information into and/or out of the smart contracts; oracles may also validate state and results. A distributed application (dApp) may run on a blockchain, using a DLT to store state, and can utilize smart contract technology. Thus, a dApp is distributed in the sense that a dApp does not use a single central server as a service core.

Embodiments will now be described in detail with reference to the Figures. Reference is now made to FIG. 1. FIG. 1 is a block diagram of a Web3 environment 100 for utilizing, supporting, and/or providing Web3 services, according to an example embodiment.

Web3 environment 100 has various layers, including a Web3 application layer 102, a tracing server 103, a frontend code layer 104, an identity and key management layer 106, a decentralized services layer 108, a distributed ledger layer 110, and an infrastructure layer 112. It should be appreciated that these layers are examples that are provided for the sake of clarity, and may not indicate any particular network topology.

Web3 application layer 102 may include one or more Web3 services that provide utility to end-users. These Web3 services may encompass a wide range of user experiences, use cases, and applications that leverage the benefits of decentralized technologies, and may not be limited to strictly Web3 environments. Some of the prominent use cases and applications may include single or multi-player games, virtual meeting environments, online collaboration tools, social media platforms, collectibles, augmented reality applications, virtual reality applications, cryptocurrency platforms, and the like. It is important to note that while these experiences and use cases can be facilitated by Web3 technologies, they are not exclusively dependent on Web3 and can be implemented in other contexts as well.

Tracing server 103 may perform operations in accordance with present embodiments that relate to the execution of decentralized applications, which may occur via one or more decentralized services of decentralized services layer 108 and/or one or more distributed ledgers of distributed ledger layer 110. Tracing server 103 is depicted and described in further detail with reference to FIG. 3.

Frontend code layer 104 for Web3 applications may refer to the application code that runs on client devices, enabling the user interface and interaction with decentralized services. This code can use various languages, such as JavaScript®, Hypertext Markup Language (HTML), and/or Cascading Style Sheets (CSS). Frontend code layer 104 can provide the functionality to interact with decentralized networks, access smart contracts, and handle user interactions. Frontend code layer 104 may include frameworks and libraries that can be utilized to build scalable and modular Web3 front-end applications (e.g., Web3 applications of Web3 application layer 102). In some embodiments, frontend code layer 104 provides the structure and content of Web pages, such as user interface elements, including text, buttons, forms, and containers. Frontend code layer 104 can be configured to provide any desired colors, fonts, layouts, and/or other visual properties of a user interface. Thus, frontend code layer 104 may enable the creation of dynamic and interactive user interfaces, facilitating the integration of decentralized functionality, and providing the particular user experience when interacting with Web3 services on client devices.

Identity and key management layer 106 provides an infrastructure for managing user identities, cryptographic keys, accounts, certificates, and signing operations within decentralized applications. Identity and key management layer 106 may ensure secure and reliable authentication, authorization, and cryptographic operations. In some embodiments, identity and key management layer 106 manages wallets, which are software applications that enable users to securely store and manage their cryptographic keys. These wallets typically employ strong encryption techniques to safeguard private keys and provide convenient interfaces for users to interact with their accounts and assets on decentralized networks. Identity and key management layer 106 may manage cryptographic keys, which are used for various purposes, including identity verification, digital signatures, encryption, and/or access control. Web3 identity systems often utilize public-key cryptography, where users possess a private key for signing transactions or providing proof of identity, and a corresponding public key for verification purposes. In some embodiments, identity and key management layer 106 manages Web3 accounts that are associated with specific identities or entities on decentralized networks. The accounts can be linked to cryptographic key pairs and may serve as the primary mechanism of interaction and ownership within the Web3 ecosystem. Accounts enable users to access and manage their assets, interact with smart contracts, and participate in network activities. Identity and key management layer 106 may manage certificates for enhancing trust and security. Certificates can serve as digital credentials that bind a user's identity to their cryptographic keys, enabling verification and validation of identities in decentralized environments. Certificates can be issued by trusted authorities or implemented through decentralized identity frameworks. In some embodiments, identity and key management layer 106 performs signing operations, which may involve using cryptographic keys to generate digital signatures. In Web3 environments, signing is used to ensure data integrity, non-repudiation, and/or secure transactions. By signing messages or transactions with their private keys, users can prove ownership and provide cryptographic proof of authenticity and integrity.

Decentralized services layer 108 includes multiple disparate entities collaborating to offer various services. These services may include distributed document storage, tokenization, proof-of-existence, distributed computation-as-a-service, distributed communications-as-a-service, distributed ledger indexing and querying, and/or payment and exchange of value. Distributed document storage enables decentralized storage of files across a network of nodes, ensuring data availability and resilience. Tokenization represents real-world assets or rights as digital tokens, enabling fractional ownership and transferability. Proof-of-existence allows users to prove the integrity and timestamped existence of digital assets. Distributed computation-as-a-service may employ collective computational power for complex tasks, whereas distributed communications-as-a-service may facilitate secure and private communication without centralized intermediaries. Distributed ledger indexing and querying can provide access to data on distributed ledgers. Payment and exchange systems enable decentralized transactions using blockchain technology.

Distributed ledger layer 110 may employ one or more distributed ledgers that include various components and mechanisms to establish trust and assurance between entities in a decentralized environment. Distributed ledger layer 110 may include distributed ledger technologies, consensus mechanisms, layer 1 and layer 2 ledgers, rollups, zero-knowledge proofs, sharding, smart contract code, smart contract execution engines, contribution nodes, validator nodes, peer-to-peer (P2P) communications protocols, contribution tokens, and oracles. Distributed ledger technologies enable the decentralized storage and management of data across a network of nodes, and consensus mechanisms ensure agreement on the state of the ledger among participating nodes. Layer 1 features utilize methods such as changing the consensus mechanism, forking the chain, and sharding. In contrast, layer 2 services include state channels, nested blockchains, rollups, and sidechains. Rollups may aggregate and process transactions off-chain before committing the transactions to the main chain. Zero-knowledge proofs enable privacy-preserving and verifiable computations. Sharding elements partition the network into smaller groups, enhancing scalability. Smart contract code represents self-executing agreements on the ledger, while smart contract execution engines handle the processing and validation of these contracts. Distributed ledger layer 110 may include contribution nodes and validator nodes that maintain and secure the network. In some embodiments, peer to peer (P2P) communications protocols facilitate decentralized communication between nodes. Distributed ledger layer 110 utilizes contribution tokens to incentivize participation and contribution within the network. In some embodiments, distributed ledger layer 110 includes one or more oracles to provide external data and real-world information to smart contracts or other distributed applications. Nodes of distributed ledgers in distributed ledger layer 110 may emit broadcasts, during the course of execution of distributed applications, which include operation records, entity identities, and/or timestamps.

Infrastructure layer 112 may include a set of components that form the hardware and/or software that supports decentralized services and models, which may be substantially similar to those found in centralized systems. Infrastructure layer 112 can include compute resources, network infrastructure, telecommunications capabilities, bandwidth availability, processing capacity, hosting services, access mechanisms, security measures, and software frameworks. Compute resources may include the hardware and software for data processing and storage such as processor(s), microprocessor(s) and memory. Network infrastructure enables the connectivity and communication between nodes in the decentralized network, and other telecommunication elements may be responsible for the exchange of data and information across different network endpoints. Hosting services can support the deployment and management of decentralized applications and services. Access mechanisms may be provided to enable users to interact with the decentralized infrastructure of various components of Web3 environment 100 and its various services. Security measures may be provided to protect data, privacy, and network integrity. Software frameworks may provide the tools and libraries for developing and running Web3 applications in Web3 application layer 102.

Figure 2:
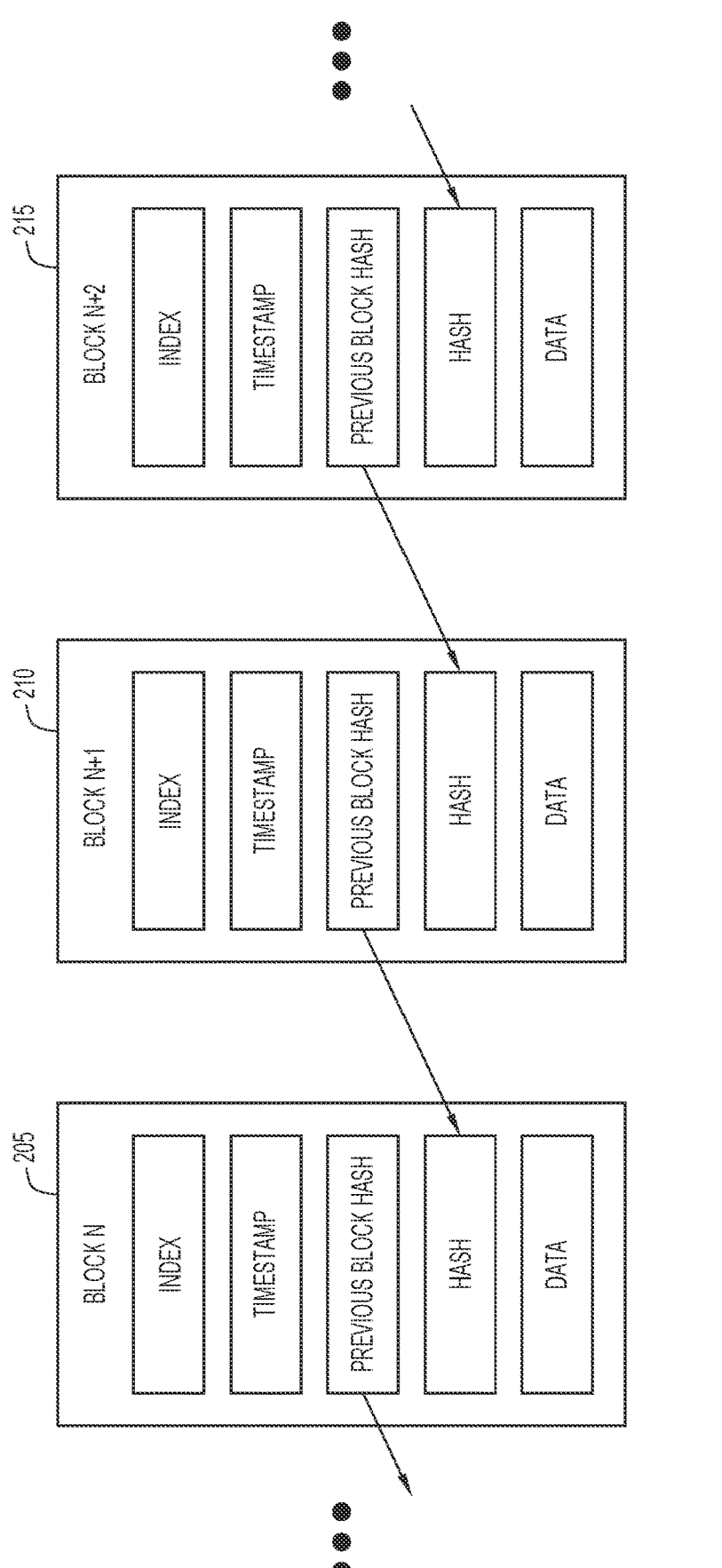
FIG. 2 is a block diagram depicting a distributed ledger for performing or supporting various operations in accordance with an embodiment of the present invention.

With reference now to FIG. 2, a block diagram is provided depicting a distributed ledger 200 for performing or supporting various operations in accordance with an embodiment of the present invention. As depicted, there are three blocks, block N (205), block N+1 (210), and block N+2 (215). It should be appreciated that this depiction of a distributed ledger 200 is only a portion of the ledger, and information can be stored as an entry in any block in distributed ledger 200. In some embodiments, distributed ledger 200 is a blockchain. Distributed ledger 200 may correspond to elements that are depicted and described with reference to distributed ledger layer 110 of FIG. 1.

Each block 205-215 may include an index, a timestamp, a previous block hash, a hash, and data. The index of a block includes an identifier for the block, such as a unique key. The timestamp of a block may indicate when the block was created, validated, and/or last modified. The previous block hash contains a hash of information in the previous block, which in turn capture, via their own hash, information in the next preceding block, ensuring that data recorded in distributed ledger 200 is immutable. In some embodiments, each hash may be a cryptographic hash, and may include a hash of the data stored in its block as well as the data corresponding to the previous block's hash. Thus, once recorded, the data in any given block cannot be altered retroactively without alteration of all subsequent blocks, which involves consensus of the network majority. The data can include any desired data, such as a transaction record, video data, text data, audio data, time-series data, encrypted data, data and corresponding metadata, and the like.

Figure 3:
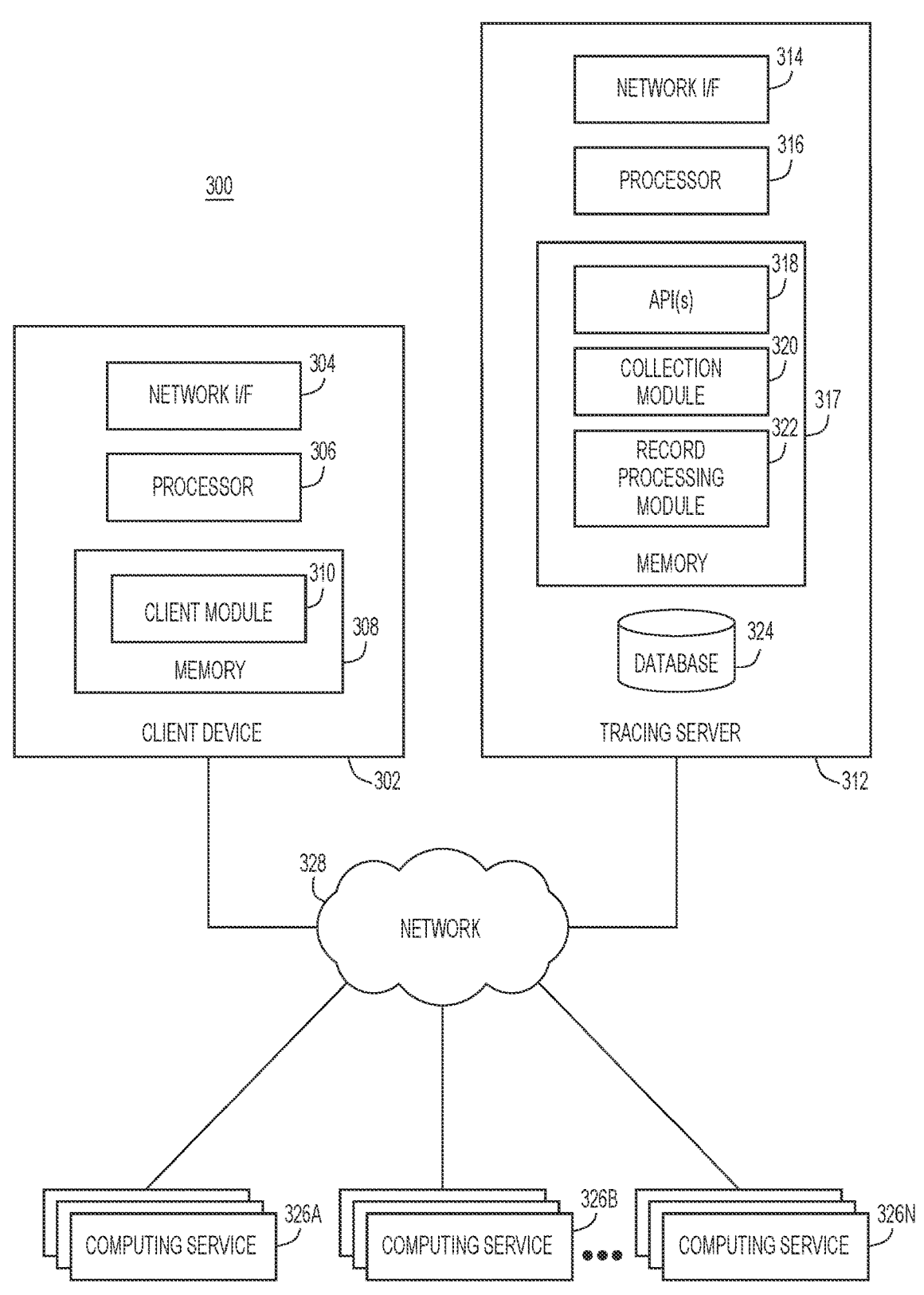
FIG. 3 is a block diagram of a computing environment for providing traceability and observability for distributed applications, according to an example embodiment.

FIG. 3 is a block diagram in which a computing environment 300 is shown for providing traceability and observability for distributed applications, according to an example embodiment. As depicted, computing environment 300 includes a client device 302, a tracing server 312, and a plurality of computing services 326A-326N that are in communication via a network 328. It is to be understood that the functional division among components have been chosen for purposes of explaining various embodiments and is not to be construed as a limiting example.

Client device 302 includes a network interface (I/F) 104, at least one processor (computer processor) 106, and memory 308, which stores instructions for a client module 310. In various embodiments, client device 302 may include a rack-mounted server, laptop, desktop, smartphone, tablet, or any other programmable electronic device capable of executing computer readable program instructions. Network interface 304 enables components of client device 302 to send and receive data over a network, such as network 328. It should be appreciated that there may be multiple client devices 302 as part of the computing environment 300; however, for simplicity, a single client device 302 is shown in the example embodiment of FIG. 1.

Client module 310 may include one or more modules or units to perform various functions of the embodiments described below. Client module 310 may be implemented by any combination of any quantity of software and/or hardware modules or units, and may reside within memory 308 of client device 302 for execution by a processor, such as processor 306. Client module 310 may be associated with one or more digital wallets, which can store (or provide proof of ownership of) fungible and/or nonfungible tokens.

Client module 310 may include any application that enables a user to access Web3 services, which can include decentralized applications ("dApps"), decentralized storage services, cryptocurrency services, streaming services, and the like. In some embodiments, client module 310 may additionally serve as a client for accessing other services, such as cloud-based storage services or other databases, cloud-based computational services, and the like. In various embodiments, client module 310 may enable users to manage their digital identities, interact with decentralized applications (e.g., using a wallet), and/or otherwise manage digital assets. Thus, client module 310 can provide Web3 service integration by supporting connectivity to distributed ledger (e.g., blockchain) networks. In some embodiments, client module 310 may enable a user to access decentralized applications to access storage solutions in order to upload, store, and/or obtain data. In some embodiments, client module 310 enables a user to request for the execution of computing tasks via distributed applications, which can be provided by one or more computing services 326A-326N.

Client module 310 may generate operation records that are included in distributed application execution requests sent by client module 310. Each operation record may serve as a unique identifier for a particular computing task that is executed by a distributed application. An operation record can be a randomly-generated string or can be generated in a predetermined manner (e.g., by incrementing a number for each new request). As a distributed application executes a computing task spanning multiple individual transactions, nodes may receive and forward the operation record so that the operation record follows a computing task. Individual nodes may transmit information including the operation record so that during or after execution of a computing task, a longitudinal history can be constructed by obtaining any desired data with which the operation record has been associated.

Tracing server 312 includes a network interface (I/F) 314, at least one processor 316, and memory 317, which stores instructions for one or more application programming interfaces (APIs) 318, a collection module 320, and a record processing module 322. Tracing server 312 may also include a database 324 and/or may access one or more other remote databases (not shown in FIG. 1). In various embodiments, tracing server 312 may include a rack-mounted server, laptop, desktop, smartphone, tablet, or any other programmable electronic device capable of executing computer readable program instructions. Network interface 314 enables components of tracing server 312 to send and receive data over a network, such as network 328. In general, tracing server 312 collects and analyzes data relating to the execution of distributed applications.

API(s) 318, collection module 320, and record processing module 322 may include one or more modules or units to perform various functions of the embodiments described below. API(s) 318, collection module 320, and record processing module 322 may be implemented by any combination of any quantity of software and/or hardware modules or units, and may reside within memory 317 of tracing server 312 for execution by a processor, such as processor 316.

Tracing server may expose one or more APIs (e.g., API(s) 318) that enable clients to communicate with tracing server 312 and/or that enable tracing server 312 to access distributed ledgers, such as those associated with computing services 326A-326N. These APIs 318 can utilize standard communication protocols, such as HTTP (Hypertext Transfer Protocol), WebSocket, or other appropriate protocols, to facilitate the transmission of data between clients and the server. Client applications (e.g., client module 310) may initiate requests by sending messages to tracing server 312 using one or more APIs 318. These requests may include operations like requesting longitudinal history of computing tasks using operation records that are included in the requests.

Collection module 320 may collect data relating to computing services 326A-326N, which can include any data or metadata that is associated with operation records. The data can be obtained in a variety of ways, including via network broadcasts, gossip protocols, event-based notifications, consensus-based propagation, secure multi-party computation (SMPC), and the like. The data may be obtained from nodes via APIs 318. Distributed ledger nodes may use a peer-to-peer network protocol to propagate data across the network. For network broadcasts, when a node emits data, the node broadcasts the information to its connected peers, which then relay the data to their own peers, creating a network-wide dissemination of the information. This broadcast mechanism ensures that all nodes eventually receive the data. In some embodiments, distributed ledger systems employ a gossip protocol, where nodes randomly select a few peers and share the emitted data with them. These selected peers, in turn, share the data with their own randomly chosen peers. Through successive rounds of gossip, the data propagates throughout the network, reaching a large portion of nodes. In some embodiments, data is obtained via event-based notifications, in which distributed ledger nodes emit data by sending the event-based notifications to other nodes. When a significant event occurs (e.g., a new block being added to the blockchain, a transaction being confirmed, etc.), the emitting node notifies other relevant nodes about the event. In some embodiments, data is obtained via consensus-based propagation: in consensus algorithms like Proof of Stake (PoS) or Proof of Work (PoW), data emission occurs as part of the consensus process. Nodes may broadcast their proposed blocks or transactions to the network, and through the consensus mechanism, a subset of nodes agrees on the validity and ordering of the emitted data. The agreed-upon data is then propagated to the rest of the network, ensuring consistency across all nodes. In some embodiments, distributed ledger nodes may employ SMPC techniques to emit or share data securely. Thus, collection module 320 may securely obtain data via a particular node that supports SMPC. The data may include transaction IDs, timestamps, the identities of entities (e.g., nodes) involved in transactions, and the like. The data obtained by collection module 320 may be stored in database 324, which can include operation records and the transaction IDs, timestamps, and/or identities of entities associated with the operation records.

Record processing module 322 may analyze data obtained by collection module 320 to generate longitudinal histories of the execution of particular computing tasks via distributed applications. Given a particular operation record, record processing module 322 can search the data obtained by collection module 320 to identify any records associated with that operation record. These individual transactions can then be organized in any desired manner (e.g., chronologically), so that a listing of every transaction involved in the execution of the distributed application can be identified, along with the time of each transaction and any computing entities involved in each transaction. Thus, record processing module 322 may generate a report or summary for a computing task that includes a comprehensive listing of each transaction, the specific distributed ledger involved in the transaction, and any other details. It should be appreciated that some distributed applications may span multiple distributed ledgers, and thus record processing module 322 may indicate the computing entities (e.g., nodes) involved in a transaction, as well as the identity of the distributed ledgers to which those computing entities belong.

Record processing module 322 may analyze data obtained by collection module 320 in order to compare two or more histories of different computing tasks. Longitudinal data for each computing task can be compared, or a subset of data for each computing task (e.g., one or more transactions and corresponding data) can be compared. Record processing module 322 may compare records to identify common entities to the different computing tasks. In particular, during the course of execution of the compared computing tasks, a same entity may have been involved in both execution histories. Thus, record processing module 322 can perform analytics, troubleshooting or similar tasks by identifying the common entity, which may represent a bottleneck in execution or may be a reason why execution either failed or partially completed. When two separate distributed computing tasks both encounter a same or similar error, a common node may be determined to be the cause of the error. Thus, record processing module 322 can identify the common entity, and subsequent computing tasks may be performed in a manner that avoids that common computing entity/actor (e.g., by using a different node, by using a different distributed application, by using a different distributed ledger, etc.). In addition, active monitoring and reporting of operational times can provide a baseline against which current operations can be compared, with variance indicating potential situations where performance is being impacted.

Computing services 326A-326N may include any computing services (e.g., Web3 distributed applications) implemented by distributed ledger networks and/or other computing entities (e.g., cloud-based processing services, data centers, etc.). In various embodiments, computing services 326A-326N can include web-based services, cloud-based services, distributed ledgers (e.g., blockchain networks), and the like, and can perform any desired computing task, such as processing time-series data, executing smart contracts, transferring fungible or nonfungible tokens, and the like.

Network 328 may include a local area network (LAN), a wide area network (WAN) such as the Internet, or a combination of the two, and includes wired, wireless, or fiber optic connections. In general, network 328 can be any combination of connections and protocols known in the art that will support communications between client device 302, tracing server 312, and/or services 326A-326N via their respective network interfaces in accordance with the described embodiments.

FIG. 4 is a flow diagram of the collection of data in a distributed application environment 400, according to an example embodiment. As depicted, distributed application environment 400 may be utilized by a user 402, and includes a Web3 front end element 404, a wallet 406, an identity management system 408, a smart contract 410, a distributed file system 412, distributed ledger technology (DLT) 414, and blocks 416. A user 402 may initiate execution of a distributed computing task (e.g., smart contract 410 or another task) by interacting with Web3 front end element 404; wallet 406 may be accessed by user 402 to provide tokens to cause various computing events to occur in distributed application environment 400. Identity management system 408 may authenticate user 402 so that a computing task may be executed. Smart contract 410 may execute when conditions are satisfied, and distributed file system 412 may store data across various computing nodes (e.g., in a blockchain). DLT 414 may include a distributed ledger comprising a plurality of blocks 416 that collectively support functions of smart contract 410 and/or other distributed applications.

In the depicted example, data records 418 are transmitted by the various components of distributed application environment 400 during the execution of a computing task. Each record 418 may be tagged with an operation record (e.g., "w3_tx_id"), and can correspond to a specific transaction. Additionally, each record 418 can indicate an entity associated with an action and the type of action performed (e.g., "user interaction Web3 front end"), a time (e.g., "timestamp"), and other metadata (e.g., a specific distributed ledger that is utilized, etc.).

Figure 5:
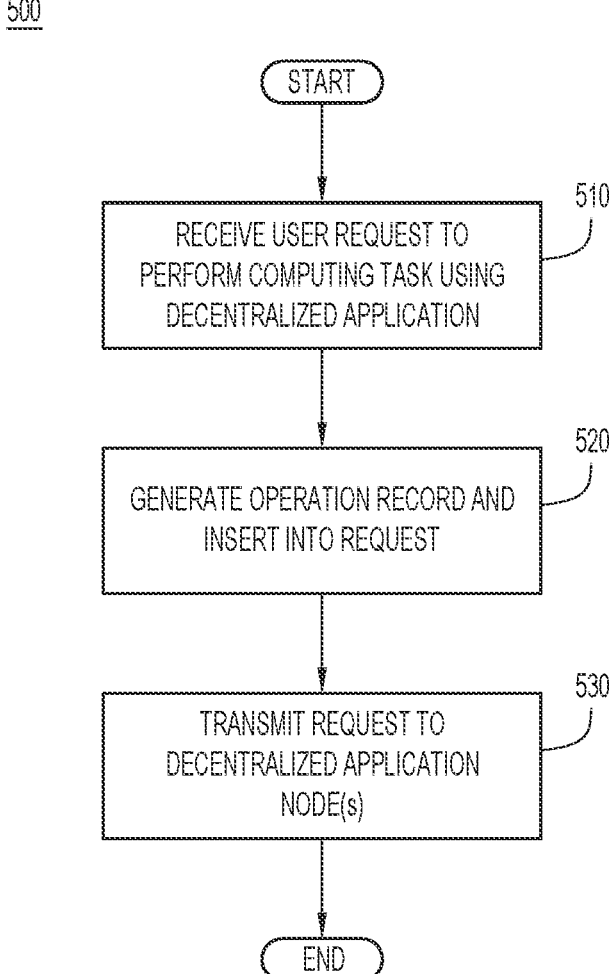
FIG. 5 is a flow chart of a method of utilizing an operation record, according to an example embodiment.

FIG. 5 is a flow chart of a method 500 of utilizing an operation record, according to an example embodiment.

A user request to perform a computing task using a decentralized application is received at operation 510. The request may be provided to a Web3 front-end application, which can send the request to one or more nodes of one or more distributed ledgers. In some embodiments, the request is initially received by a server, which then provides the request to the appropriate distributed ledger technology. The request may include a token or tokens as payment for execution of the processing task, and can include data that the user is requesting to be processed.

An operation record is generated and inserted into, or otherwise associated with, the request at operation 520. The client device of a user may generate the operation record, or in embodiments in which a server receives the request, the server may alternatively generate the operation record. The operation record may be a random or pseudo-random string that can be used to uniquely identify each transaction in a distributed computing task that spans transactions, each of which may occur on a same distributed ledger, or may span multiple distributed ledgers. Additionally, in some embodiments, some of the transactions or other computing events may occur on centralized services, such as servers or other cloud platforms.

The request is transmitted to one or more nodes of the decentralized application at operation 530. When each node or other computing entity involved in the requested decentralized computing task receives data relating to the task, the data may be associated with the operation record. Thus, each node or other computing entity can broadcast the operation record, along with other metadata (e.g., the identity of the node (e.g., an "actor identifier"), a timestamp, action(s) performed, etc.).

Figure 6:
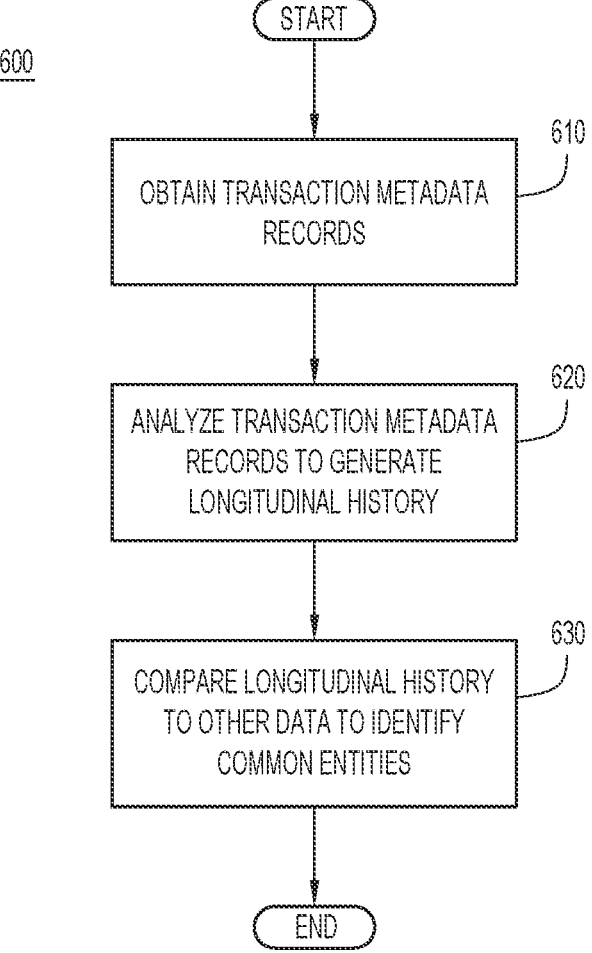
FIG. 6 is a flow chart of a method of analyzing operation records, according to an example embodiment.

FIG. 6 is a flow chart of a method 600 of analyzing operation records, according to an example embodiment.

Transaction metadata records are obtained at operation 610. The metadata records may be broadcast by nodes of distributed ledgers, and can include an operation record, transaction IDs, identities of the nodes or other involved entities, timestamps, and any other desired data. The metadata records can be obtained during or after execution of a distributed application, and may be obtained by one or more entities (e.g., a client device, a server, etc.). In some embodiments, the metadata records may be stored to a distributed ledger itself.

The transaction metadata records are analyzed to generate a longitudinal history at operation 620. Records that have a same operation record may be identified and aggregated to provide the longitudinal history of the execution of the distributed application that is associated with that operation record. These metadata records can be sorted by timestamp, computing entity involved, and the like as desired.

The longitudinal history is compared to other data to identify common entities at operation 630. The other data may be another longitudinal history or simply one or more metadata records. Common computing entities (e.g., nodes) between the longitudinal history and the other data may be identified, and the identities of the common entities can be used to perform intelligent execution of future decentralized applications, to perform debugging tasks, and/or other tasks. In one embodiment, an application may leverage transactions which are written to distributed ledgers, such as the transmission of remittances. In another embodiment, the operational state of proof-of-identity systems may be tracked, in which new items are being produced on a production line with identities being created and validated by a third party. The binding of identity to item on a production line can be time critical, so identifying performance issues can be impactful. Another embodiment may track operational states of gaming application, in which latency in functions provided within the gaming infrastructure can have an impact on the gaming experience. Thus, the operational state of one or more computing entities may be evaluated, and can be compared against predetermined criteria to identify any issues. For example, a distributed ledger node can be compared against performance criteria including latency criteria (e.g., how long a transaction takes to complete) and/or throughput criteria (e.g., how many transactions are processed over a span of time).

Figure 7:
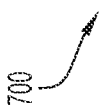
FIG. 7 is a block diagram of a device that may be configured to perform operations to enable traceability and observability for distributed applications, as presented herein.

Referring now to FIG. 7, FIG. 7 illustrates a hardware block diagram of a computing device 700 that may perform functions associated with operations discussed herein in connection with the techniques depicted in FIGS. 1-6. In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O 714, and 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/ antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O 714 allow for input and output of data and/or information with other entities that may be connected to computing device 700. For example, I/O 714 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and' one or more of can be represented using the '(s)' nomenclature (e.g., one or more element(s)).

In some aspects, the techniques described herein relate to a method including: obtaining a plurality of transaction metadata records corresponding to a plurality of transactions related to execution of a computing task by a decentralized application, wherein each transaction metadata record includes a same operation record that identifies the computing task, and an actor identifier that indicates an identity of an entity involved in a particular transaction of the plurality of transactions; generating a longitudinal history of the execution of the computing task that identifies the entity involved in each transaction based on the plurality of transaction metadata records; and determining an operational state of one or more entities based on comparing the longitudinal history of the execution of the computing task to data relating to a different computing task.

In some aspects, the techniques described herein relate to a method, wherein determining the operational state of the one or more entities further including: determining one or more common entities between the computing task and the different computing task by comparing the longitudinal history to the data relating to the different computing task; and evaluating performance of the one or more common entities.

In some aspects, the techniques described herein relate to a method, further including: providing a timestamp for each transaction, wherein the timestamp is associated with each transaction metadata record.

In some aspects, the techniques described herein relate to a method, wherein the plurality of transactions includes at least two transactions that occur on different distributed ledgers.

In some aspects, the techniques described herein relate to a method, wherein one entity of the one or more entities includes a distributed ledger node, and wherein determining the operational state includes: determining that the distributed ledger node fails one or more performance criteria selected from a group of: a latency criterion, and a throughput criterion.

In some aspects, the techniques described herein relate to a method, wherein a transaction of the plurality of transactions is selected from a group of: a distributed ledger transaction, a smart contract transaction, a storage service transaction, and a streaming service transaction.

In some aspects, the techniques described herein relate to a method, further including: obtaining each transaction metadata record as an event code that is emitted by a component of the decentralized application.

In some aspects, the techniques described herein relate to a method, further including: storing the plurality of transaction metadata records to one or more of: a distributed ledger, and a database.

In some aspects, the techniques described herein relate to a method, further including: executing a subsequent computing task by a second decentralized application, wherein the second decentralized application is selected based on the determined operational state of the one or more entities, and wherein the second decentralized application includes a set of entities that does not include at least one of the one or more entities.

In some aspects, the techniques described herein relate to a system including: one or more computer processors; one or more computer readable storage media; and program instructions stored on the one or more computer readable storage media for execution by at least one of the one or more computer processors, the program instructions including instructions to: obtain a plurality of transaction metadata records corresponding to a plurality of transactions related to execution of a computing task by a decentralized application, wherein each transaction metadata record includes a same operation record that identifies the computing task, and an actor identifier that indicates an identity of an entity involved in a particular transaction of the plurality of transactions; generate a longitudinal history of the execution of the computing task that identifies the entity involved in each transaction based on the plurality of transaction metadata records; and determine an operational state of one or more entities based on comparing the longitudinal history of the execution of the computing task to data relating to a different computing task.

In some aspects, the techniques described herein relate to a system, wherein the instructions to determine the operational state of the one or more entities further include instructions to: determine one or more common entities between the computing task and the different computing task by comparing the longitudinal history to the data relating to the different computing task; and evaluate performance of the one or more common entities.

In some aspects, the techniques described herein relate to a system, wherein the program instructions further include instructions to: provide a timestamp for each transaction, wherein the timestamp is associated with each transaction metadata record.

In some aspects, the techniques described herein relate to a system, wherein the plurality of transactions includes at least two transactions that occur on different distributed ledgers.

In some aspects, the techniques described herein relate to a system, wherein one entity of the one or more entities includes a distributed ledger node, and wherein the instructions to determine the operational state include instructions to: determine that the distributed ledger node fails one or more performance criteria selected from a group of: a latency criterion, and a throughput criterion.

In some aspects, the techniques described herein relate to a system, wherein a transaction of the plurality of transactions is selected from a group of: a distributed ledger transaction, a smart contract transaction, a storage service transaction, and a streaming service transaction.

In some aspects, the techniques described herein relate to a system, wherein the program instructions further include instructions to: execute a subsequent computing task by a second decentralized application, wherein the second decentralized application is selected based on the determined operational state of the one or more entities, and wherein the second decentralized application includes a set of entities that does not include at least one of the one or more entities.

In some aspects, the techniques described herein relate to one or more non-transitory computer readable storage media having program instructions embodied therewith, the program instructions executable by a computer to cause the computer to perform operations including: obtain a plurality of transaction metadata records corresponding to a plurality of transactions related to execution of a computing task by a decentralized application, wherein each transaction metadata record includes a same operation record that identifies the computing task, and an actor identifier that indicates an identity of an entity involved in a particular transaction of the plurality of transactions; generate a longitudinal history of the execution of the computing task that identifies the entity involved in each transaction based on the plurality of transaction metadata records; and determine an operational state of one or more entities based on comparing the longitudinal history of the execution of the computing task to data relating to a different computing task.

In some aspects, the techniques described herein relate to one or more non-transitory computer readable storage media, wherein the program instructions for determining the operational state of the one or more entities further cause the computer to: determine one or more common entities between the computing task and the different computing task by comparing the longitudinal history to the data relating to the different computing task; and evaluate performance of the one or more common entities.

In some aspects, the techniques described herein relate to one or more non-transitory computer readable storage media, wherein the program instructions further cause the computer to: provide a timestamp for each transaction, wherein the timestamp is associated with each transaction metadata record.

In some aspects, the techniques described herein relate to one or more non-transitory computer readable storage media, wherein the plurality of transactions includes at least two transactions that occur on different distributed ledgers.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining a plurality of transaction metadata records corresponding to a plurality of transactions related to execution of a computing task by a decentralized application, wherein each transaction metadata record includes a same operation record that identifies the computing task, and an actor identifier that indicates an identity of an entity involved in a particular transaction of the plurality of transactions;
generating a longitudinal history of the execution of the computing task that identifies the entity involved in each transaction based on the plurality of transaction metadata records; and
determining an operational state of one or more entities based on comparing the longitudinal history of the execution of the computing task to data relating to a different computing task.

2. The method of claim 1, wherein determining the operational state of the one or more entities further comprising:

determining one or more common entities between the computing task and the different computing task by comparing the longitudinal history to the data relating to the different computing task; and evaluating performance of the one or more common entities.

3. The method of claim 1, further comprising:

providing a timestamp for each transaction, wherein the timestamp is associated with each transaction metadata record.

4. The method of claim 1, wherein the plurality of transactions includes at least two transactions that occur on different distributed ledgers.

5. The method of claim 1, wherein one entity of the one or more entities comprises a distributed ledger node, and wherein determining the operational state comprises:

determining that the distributed ledger node fails one or more performance criteria selected from a group of: a latency criterion, and a throughput criterion.

6. The method of claim 1, wherein a transaction of the plurality of transactions is selected from a group of: a distributed ledger transaction, a smart contract transaction, a storage service transaction, and a streaming service transaction.

7. The method of claim 1, further comprising:

obtaining each transaction metadata record as an event code that is emitted by a component of the decentralized application.

8. The method of claim 1, further comprising:

storing the plurality of transaction metadata records to one or more of: a distributed ledger, and a database.

9. The method of claim 1, further comprising:

executing a subsequent computing task by a second decentralized application, wherein the second decentralized application is selected based on the operational state of the one or more entities, and wherein the second decentralized application comprises a set of entities that does not include at least one of the one or more entities.

10. A system comprising:

one or more computer processors;

one or more computer readable storage media; and program instructions stored on the one or more computer readable storage media for execution by at least one of the one or more computer processors, the program instructions comprising instructions to:

obtain a plurality of transaction metadata records corresponding to a plurality of transactions related to execution of a computing task by a decentralized application, wherein each transaction metadata record includes a same operation record that identifies the computing task, and an actor identifier that indicates an identity of an entity involved in a particular transaction of the plurality of transactions;

generate a longitudinal history of the execution of the computing task that identifies the entity involved in each transaction based on the plurality of transaction metadata records; and determine an operational state of one or more entities based on comparing the longitudinal history of the execution of the computing task to data relating to a different computing task.

11. The system of claim 10, wherein the instructions to determine the operational state of the one or more entities further comprise instructions to:

determine one or more common entities between the computing task and the different computing task by comparing the longitudinal history to the data relating to the different computing task; and evaluate performance of the one or more common entities.

12. The system of claim 10, wherein the program instructions further comprise instructions to:

provide a timestamp for each transaction, wherein the timestamp is associated with each transaction metadata record.

13. The system of claim 10, wherein the plurality of transactions includes at least two transactions that occur on different distributed ledgers.

14. The system of claim 10, wherein one entity of the one or more entities comprises a distributed ledger node, and wherein the instructions to determine the operational state comprise instructions to:

determine that the distributed ledger node fails one or more performance criteria selected from a group of: a latency criterion, and a throughput criterion.

15. The system of claim 10, wherein a transaction of the plurality of transactions is selected from a group of: a distributed ledger transaction, a smart contract transaction, a storage service transaction, and a streaming service transaction.

16. The system of claim 10, wherein the program instructions further comprise instructions to:

execute a subsequent computing task by a second decentralized application, wherein the second decentralized application is selected based on the operational state of the one or more entities, and wherein the second decentralized application comprises a set of entities that does not include at least one of the one or more entities.

17. One or more non-transitory computer readable storage media having program instructions embodied therewith, the program instructions executable by a computer to cause the computer to perform operations including:

obtain a plurality of transaction metadata records corresponding to a plurality of transactions related to execution of a computing task by a decentralized application, wherein each transaction metadata record includes a same operation record that identifies the computing task, and an actor identifier that indicates an identity of an entity involved in a particular transaction of the plurality of transactions;

generate a longitudinal history of the execution of the computing task that identifies the entity involved in each transaction based on the plurality of transaction metadata records; and determine an operational state of one or more entities based on comparing the longitudinal history of the execution of the computing task to data relating to a different computing task.

18. The one or more non-transitory computer readable storage media of claim 17, wherein the program instructions for determining the operational state of the one or more entities further cause the computer to:

determine one or more common entities between the computing task and the different computing task by comparing the longitudinal history to the data relating to the different computing task; and evaluate performance of the one or more common entities.

19. The one or more non-transitory computer readable storage media of claim 17, wherein the program instructions further cause the computer to:

provide a timestamp for each transaction, wherein the timestamp is associated with each transaction metadata record.

20. The one or more non-transitory computer readable storage media of claim 17, wherein the plurality of transactions includes at least two transactions that occur on different distributed ledgers.

* * * * *